(12) United States Patent
Ghuman et al.

(10) Patent No.: US 11,775,357 B1
(45) Date of Patent: Oct. 3, 2023

(54) RELEVANT NOTIFICATIONS OF THIRD PARTY CONTENT

(71) Applicant: American Express Travel Related Services Company, Inc., New York, NY (US)

(72) Inventors: Ravneet Ghuman, Phoenix, AZ (US); Madhu Sudhan Reddy Gudur, Phoenix, AZ (US); Sandeep Bose, Phoenix, AZ (US); Shashank Kapoor, Phoenix, AZ (US); Rahul Panwar, New York, NY (US); Nikhil Jain, Phoenix, AZ (US); Vinod Yadav, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 206 days.

(21) Appl. No.: 17/153,170

(22) Filed: Jan. 20, 2021

(51) Int. Cl.
| | | |
|---|---|---|
| G06F 16/00 | (2019.01) | |
| G06F 9/54 | (2006.01) | |
| G06F 16/958 | (2019.01) | |
| G06N 20/00 | (2019.01) | |
| G06F 16/955 | (2019.01) | |
| G06F 16/906 | (2019.01) | |

(52) U.S. Cl.
CPC .......... *G06F 9/542* (2013.01); *G06F 16/906* (2019.01); *G06F 16/958* (2019.01); *G06F 16/9566* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 7,594,277 B2 * | 9/2009 | Zhang | G06F 16/313 726/30 |
| 2006/0005247 A1 * | 1/2006 | Zhang | G06F 16/325 707/E17.084 |
| 2012/0109966 A1 * | 5/2012 | Liang | G06F 16/954 707/E17.014 |
| 2014/0122493 A1 * | 5/2014 | Sifry | G06F 16/285 707/738 |
| 2015/0134808 A1 * | 5/2015 | Fushman | G06Q 30/02 709/224 |
| 2015/0193510 A1 * | 7/2015 | Raess | G06F 16/248 707/727 |

(Continued)

Primary Examiner — Hasanul Mobin
(74) Attorney, Agent, or Firm — Thomas | Horstemeyer, LLP

(57) ABSTRACT

Disclosed are various embodiments for generating relevant notifications of content generated by third party data sources. In some embodiments, a system comprises a computing device and machine readable instructions. The computing device includes a processor and a memory. The machine-readable instructions can be stored in the memory that, when executed by the processor, cause the computing device to receive content from a third party data source based at least in part on a keyword topic. An embedding for the content is generated. The system can classify a portion of the content as associated with the keyword topic. Organizations can be identified from the portions of the content. The system can generate a list from the organizations identified in the content and transmit a notification to a client device regarding the content.

20 Claims, 5 Drawing Sheets

(56) References Cited

U.S. PATENT DOCUMENTS

| | | | | |
|---|---|---|---|---|
| 2015/0365447 A1* | 12/2015 | Klein | .................... | G06F 16/00 |
| | | | | 709/204 |
| 2016/0092581 A1* | 3/2016 | Joshi | .................. | G06F 16/9535 |
| | | | | 707/732 |
| 2016/0117400 A1* | 4/2016 | Agarwal | ................ | H04L 51/52 |
| | | | | 706/12 |
| 2016/0171540 A1* | 6/2016 | Mangipudi | ........ | G06Q 30/0255 |
| | | | | 705/14.53 |
| 2016/0196491 A1* | 7/2016 | Chandrasekaran | ... | G06F 16/248 |
| | | | | 706/50 |
| 2017/0193568 A1* | 7/2017 | Pattabiraman | ..... | G06Q 30/0222 |
| 2018/0253661 A1* | 9/2018 | Strauss | ................ | G06N 20/00 |
| 2019/0038190 A1* | 2/2019 | Zhong | .................. | A61B 5/4266 |
| 2019/0097961 A1* | 3/2019 | Kvalnes | ................ | H04W 4/12 |
| 2019/0334851 A1* | 10/2019 | Shi | ........................ | H04L 67/306 |
| 2021/0149899 A1* | 5/2021 | Gutiérrez | ............... | G06F 9/451 |
| 2021/0383127 A1* | 12/2021 | Kikin-Gil | ............. | G06F 18/256 |

* cited by examiner

RELEVANT NOTIFICATIONS OF THIRD PARTY CONTENT

BACKGROUND

Third party entities can generate and publish content on a variety of topics. Oftentimes, individuals need to stay informed of the latest publicly available content for one or more topics. However, third party entities generate a large volume of content and existing notification systems rely on identifying relevant content based on a particular keyword in the text. As a result, existing systems are often unable to process the large volume of data in a timely manner in order to generate and provide relevant notifications of third party content. Accordingly, an improved system and method for generating relevant notifications of third party content is needed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
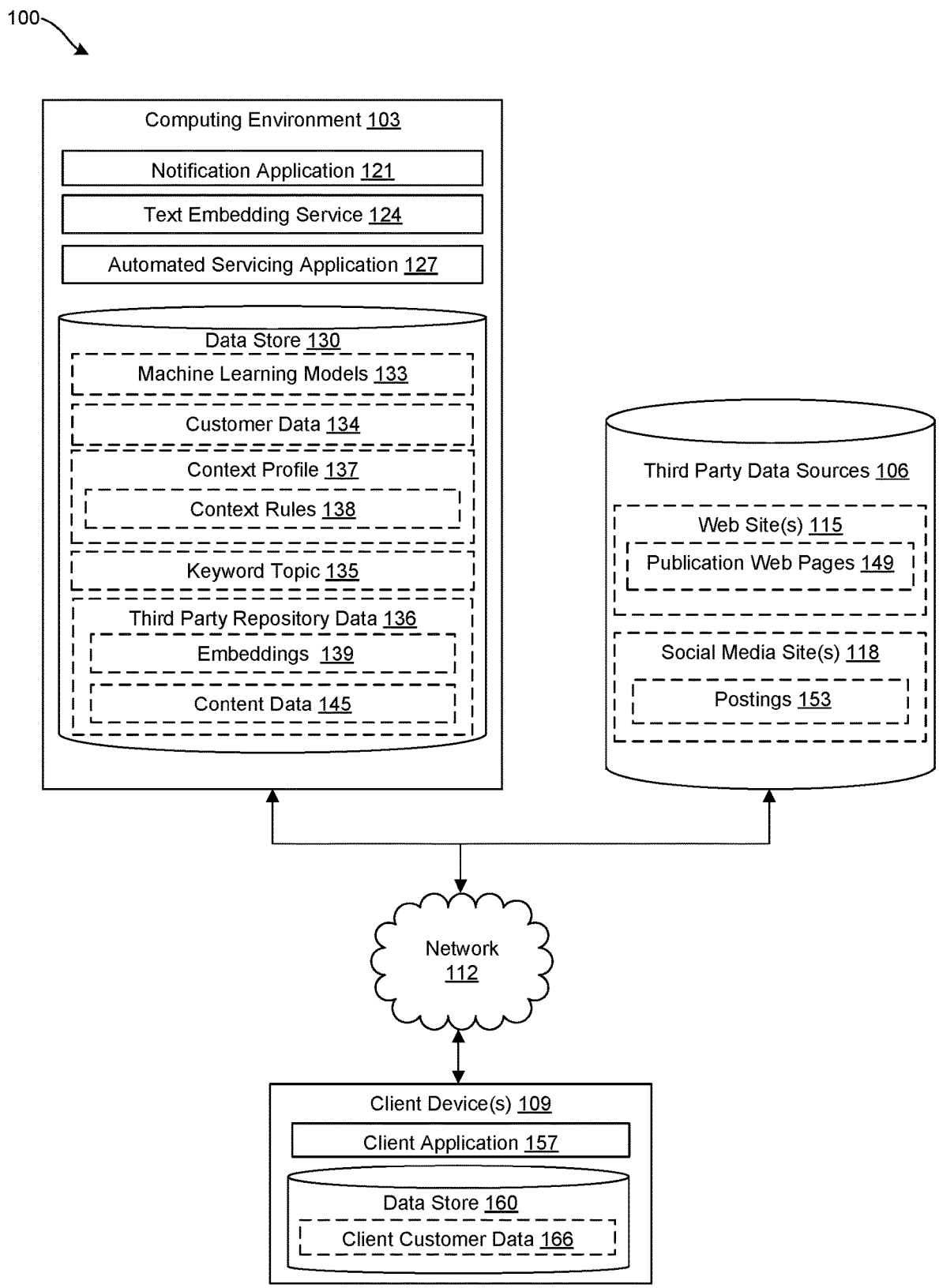
FIG. 1 is a drawing of a networking environment according to various embodiments of the present disclosure.

Disclosed are various approaches for generating relevant notifications of content generated by third party data sources in a real-time or near real-time manner. Third party entities can generate and publish content on a variety of topics. Various individuals can rely on the published content of third party entities in order to perform their job responsibilities. Content can refer to information that is publicly available, such as news content, academic publications, credit bureau reports, organization publications, industry reports, and other suitable content. Third party entities that generate and publish the content can include news organizations, magazine organizations, academic institutions, companies, social media sites, non-profit organizations, government organizations, credit bureaus, and other suitable organizations. These third party entities can publish content at various times throughout a day, a week, a month, and a year. As a result, individuals can struggle to filter relevant content that helps keep them informed of pertinent information, which in turn can help with the execution of an individual's job responsibilities.

Further, some individuals can rely on certain trusted data source providers. However, these trusted data source providers may take a considerable amount of time to aggregate relevant information and provide it to an individual. As a result, individuals are at an information disadvantage because of the delay.

For example, in the financial industry, an individual may be responsible for managing financial services offered to a portfolio of companies. The individual may rely on financial reports provided by a credit bureau for insights into noteworthy events relevant to a company in their portfolio. Some examples of noteworthy events may include, but are not limited to, bankruptcy proceedings, layoffs, fraud investigations, merger and acquisition announcements, financial distress and other suitable events. However, a credit bureau may release reports every thirty to sixty days. As a result, individuals that rely on these reports from credit bureaus may learn of noteworthy events relevant to their companies thirty to sixty days after these events have been publicized.

Various embodiments improve the functioning of a computer by identifying relevant content based on a context of certain topics described in the text of the content. The embodiments also improve the functioning of a computer by providing a notification of the filtered content in real-time or near real-time manner after the publication of the filtered content. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

FIG. 1 depicts a network environment 100 according to various embodiments. The network environment 100 can include a computing environment 103, third party data sources 106, and client devices 109, which can be in data communication with each other via a network 112. The computing environment 103 can represent computing resources operated by an entity. In some example scenarios, the entity can be a company organization, a non-profit organization, a financial institution, an academic institution, and other suitable entity organizations. Applications hosted by or executed in the computing environment 103 can monitor content generated by third party data sources 106, generate relevant notifications from the third party content, and transmit the relevant notification to one or more client devices 109 of individuals associated with the entity. In some scenarios, the relevant notifications can cause an automated customer action based on the context of the relevant notification. The third party data sources 106 can represent third party entities that generate content for individuals. For example, third party data sources 106 can include web sites 115 and social media sites 118. It should be appreciated that third party data sources 106 can include other entities that produce content. Also, the client device 109 can include a device operated by an individual associated with the entity operating the computing environment 103.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

In addition, the computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a notification application 121, a text embedding service 124, an automated servicing application 127, and other applications, services, processes, systems, engines, or functionality not discussed in detail herein.

The notification application 121 can be executed to monitor content generated by the third party data sources 106, filter relevant content according to one or more criteria, and identify organizations associated with the filtered content. In some example implementations, the notifications can be transmitted to client devices 109 of individuals associated with the entity operating the computing environment 103. For instance, an individual can be responsible for managing a portfolio of companies or other suitable organizations. As a result, the individual can receive relevant content that discusses one of their portfolio companies in a specified context.

The text embedding service 124 can be executed to convert the content generated by third party data sources 106 into one or more embeddings 139. The embeddings 139 (e.g., a numeric representation) can in turn be processed by the machine learning models 133 in order to filter relevant content based on a keyword topic, and then, the embeddings 139 of the filtered relevant content can be used to identify organizations potentially impacted by the events described in the relevant content.

The automated servicing application 127 can be executed to automate a customer action based on the identification of organizations that are likely to be impacted by the filtered content (e.g., an event). In some examples, a machine learning model 133 can be used for determining the appropriate customer action to implement based on the identification of organizations that are likely to be impacted by the filtered content, such as for example a business organization, a non-profit, or other suitable organizations.

For example, for a financial institution, the customer action can refer to actions that are automatically implemented based on a set of rules or a machine learning model 133. The customer actions can be an automated adjustment of a line of a credit for an identified organization, an adjustment in the underwriting for an identified organization, an adjustment in marketing incentives for an identified organization, and other suitable actions that can result from a discovery of relevant content. It should be noted that the automated actions can vary.

In other examples, a customer action can refer to transmitting a notification of the content to a client device 109 of an individual that is responsible for managing an organization discussed in the filtered content (e.g., a news article). The notification may include a uniform resource locator (URL) of the content, a business name, a business unit, an industry, a level of exposure to the content, a creation date for the content, and other suitable pieces of data related to the content. The notification may be used by the individual to manually review a profile of the organization identified in the notification.

Also, various data is stored in data store 130 that is accessible to the computing environment 103. The data store 130 can be representative of a plurality of data stores, which can include relational databases or non-relational databases such as object-oriented databases, hierarchical databases, hash tables or similar key-value data stores, as well as other data storage applications or data structures. Moreover, combinations of these databases, data storage applications, and/ or data structures can be used together to provide a single, logical, data store. This data can include one or more machine learning models 133, customer data 134, keyword topics 135, a third party repository data 136, context profiles 137, and potentially other data.

The machine learning models 133 can represent different computer-implemented models for classifying and identifying data. For example, a first machine learning model 133 can be used to filter out content that is not relevant to a specified topic. Additionally, the machine learning model 133 can identify a subset of content that is relevant to a certain specified topic in a particular context (e.g., one or more situational factors). For example, the first machine learning model 133 can be trained based on reference content. In some cases, the reference content can be selected based on a keyword topic 135. As another example, a second machine learning model 133 can be used to identify organizations that are discussed in the filtered content. In some examples, the second machine learning model 133 can be trained to identify a variety of organizations (e.g., non-profits, corporation, government organizations, etc.). The second machine learning model 133 may be trained based on a set of rules that corresponds to various manners in which an organization can be represented in text. In some cases, the second machine learning model 133 can identify different types of organizations based on different organization databases (e.g., government database). Other machine learning models 133 can be used for other functions for filtering relevant content according to user-specified criteria (e.g., selection of a keyword topic 135) and the generation of relevant notifications.

In some embodiments, the machine learning models 133 can be generated based at least in part on one or more machine learning algorithms as applied to one or more training sets and/or reference data sets (e.g., data sets of reference publications, reference paragraphs, reference social media posts, etc.). The one or more machine learning algorithms can include, without limitation, word2vec, doc2vec, recurrent neural networks (e.g., Long Short-Term Memory, etc.), recursive neural networks, convolutional neural networks and/or any other machine learning algorithms configured to identify, extract, and/or quantify a context associated with instances of text in published web pages and social media postings with respect to a keyword topic 135. After the one or more machine learning models 133 are generated, the notification application 121 can be further configured to classify submitted instances of text (e.g., from publication web pages and social media postings) as being relevant to a keyword topic 135, and in some instances a context profile 137 of the keyword topic 135.

The customer data 134 can include a list of customer entities for the entity operating the computing environment 103. The customer data 134 can also include the relationships between different customer entities, such as parent-child organizations, subsidiary organizations to parent organization, and other relationships. The customer data 134 can represent data associated with various sales and marketing activities for the entity. The third party repository data 136 can represent stored data elements related to filtering content from the third party data sources 106. For example, the third party repository data 136 can include content data 145, the embeddings 139 of the and other suitable third party data elements.

The content data 145 can represent content received from the third party data sources 106. The content data 145 can include content from the publication web pages 149, postings 153 from the social media sites 118, and other suitable third party data sources 106. Content from the publication web page 149 can include news articles, academic publications, news blogs, and other suitable news publication.

The postings 153 from the social media sites 118 can represent published content generated from social media user accounts on the social media sites 118. The postings 153 can be received from social media user accounts that are associated with various organizations, such as non-profit organizations, corporations, academic institutions, government organizations, and other suitable organizations. A content application programming interface (API) can be invoked to retrieve content based on a keyword topic 135. Some non-limiting examples of a content API can be News API, Google News API, Contextual Web Search, and others.

The keyword topic 135 can represent a topic of interest that is being monitored for published content. The keyword topic 135 can be used as a criterion for filtering for published content. For example, if an individual is interested in the financial health of a particular organization, the keyword topics 135 can include "layoffs," "bankruptcy," "financial distress," "merger," "acquisition," "release of earnings report," "sale of business or business unit," "facility closed," and other suitable financial terms.

The context profile 137 can represent additional criteria for filtering published content associated with the keyword topic 135. The context profile 137 can represent the appropriate context requested for the keyword topic 135. The context profile 137 can include one or more context rules 138 that can evaluate particular factors that represent the appropriate context or situation described in the text for the keyword topic 135. For example, a context profile 137, for the previous keyword topics 135 regarding financial health, can include a set of context rules 138 related to identifying organizations that are negatively affected by layoff events or announcements. The context rules 138 can be selected to correspond to the objective of the context profile 137.

The embeddings 139 can represent a numeric representation or a vector of the content data 145. In some examples, the text embedding service 124 can generate the embeddings 139 by generating a paragraph identifier for each paragraph in the publication web page 149. Then, the text embedding service 124 can generate a numeric representation or a vector for each word and/or a set of words in the paragraphs. For example, a numeric representation can be generated to represent a word and its surrounding words. The numeric representations can be used as input for the machine learning models 133 for comparing the text of the publication web page 149 to a set of reference paragraphs 212 (FIG. 2).

The third party data sources 106 can represent entities that generate content that is accessible over the network 112. As illustrated, the third party data sources 106 can include web sites 115 and social media sites 118 that provide content. For example, the third party data sources 106 can include news organizations (e.g. newspapers, news stations, etc.), academic institutions, industry research organizations, government organizations, and other suitable news sources. The web sites 115 can display various publication web pages 149. Each publication web page 149 can include content, such as news articles, that describes an event. The web sites 115 can publish content in different formats. For example, the content can be retrieved from web pages, mobile application user interfaces, and other suitable formats.

The social media sites 118 can represent different social media providers, in which the social media accounts can publish postings 153 in a variety of different formats (e.g. web pages, mobile application user interface).

The client device 109 is representative of a plurality of client devices that can be coupled to the network 112. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 109 or can be connected to the client device through a wired or wireless connection.

The client device 109 can be configured to execute various applications such as a client application 157 or other applications. The client application 157 can be executed in a client device 109 to access network content served up by the computing environment 103 or other servers, thereby rendering a user interface on the display. To this end, the client application 157 can include a browser, a dedicated application, or other executable, and the user interface can include a web page, an application screen, or other user mechanism for obtaining user input. The client device 109 can be configured to execute applications beyond the client application 157 such as email applications, social networking applications, word processors, spreadsheets, or other applications.

Also, various data is stored in a data store 160 that is accessible to the client device 109. Data in the data store 160 may include client customer data 166 and other suitable client device data. The client customer data 166 can represent internal customer data that is associated with a portfolio of customers that are managed by an individual of the client device 109. The internal customer data can represent data that has been stored for the portfolio of customers. The internal customer can include patterns, a present status of the customer, and other suitable internal customer data.

Next, a general description of the operation of the various components of the network environment 100 is provided. To begin, it is assumed a user is interested in the notification application 121 monitoring content for a particular keyword topic 135. For example, if the user is interested in the financial health of a particular organization, the keywords might include terms such as e.g., "bankruptcy," "layoff," "financial distress," "merger," "acquisition," "release of earnings report," "sale of business or business unit," "facility closed," etc.

The notification application 121 can be configured to identify content that matches a context profile 137 for the keyword topic 135. For example, the context profile 137 for the term "layoffs" can be to identify organizations that are negatively affected by layoff events or announcements. As another example, the context profile 137 identifying organizations that are negatively affected by bankruptcy will not classify a news article as relevant if the news articles is directed to a layoff of an individual person, such as a chief executive officer or director of a business unit. It should be noted that keyword topics 135 and the context profile 137 can vary.

First, the notification application 121 can configure a content API to transmit content that includes the keyword topic 135. As a result, the notification application 121 can retrieve or receive the content published by third party data sources 106. The content can be stored in the third party repository data 136.

The content can be converted to one or more embeddings 139 (e.g., a numeric representation) for further analysis. The embeddings 139 for the content can be compared against a reference embedding for the keyword topic 135. In some embodiments, the reference embeddings can be selected based on a specified context profile 137 for the keyword topic 135. The comparison can involve generating a similarity score (e.g., using a cosine distance, cosine similarity, a dot product, an Euclidean distance), and the similarity score can be compared to a similarity threshold (e.g., a similarity threshold value of 0.71) for classification with respect to a keyword topic 135 and context profile 137.

As a result, the comparison can be used to identify which content is relevant to the keyword topic 135 and the context profile 137. In some cases, the notification application 121 can identify or extract certain paragraphs from content based on the keyword topic 135 and the context profile 137 for the keyword topic 135. Thus, a subset of the content can represent certain publication web pages 149 or certain extracted paragraphs from the publication web pages 149.

The notification application 121 can identify organizations that are the focus of the subset of the content. Accordingly, a refined list of organizations can be generated from the initial identification of all organizations listed in the subset of the content in some implementations. As a result, organizations that are merely included in the text, but are not the focus of the text, can be filtered out. A set of context rules 138 can be applied to each instance of an organization in the text in order to determine whether a particular organization is a focus of a particular paragraph or a particular publication web page 149. Organizations that satisfy one or more of the context rules 138 can be placed on a refined list of organizations.

The refined list of organizations discussed in the subset of content can be used to identify customers impacted for the entity operating the computing environment 103. The notification application 121 can use a matching technique (e.g., fuzzy matching) to identify its customers that are on the refined list of organizations. Once the customer has been identified, the notification application 121 can perform a customer action. The customer action can include sending a notification to a user account of an individual that is managing the customer. The notification can include the identified customer and the filtered content.

Figure 2A:
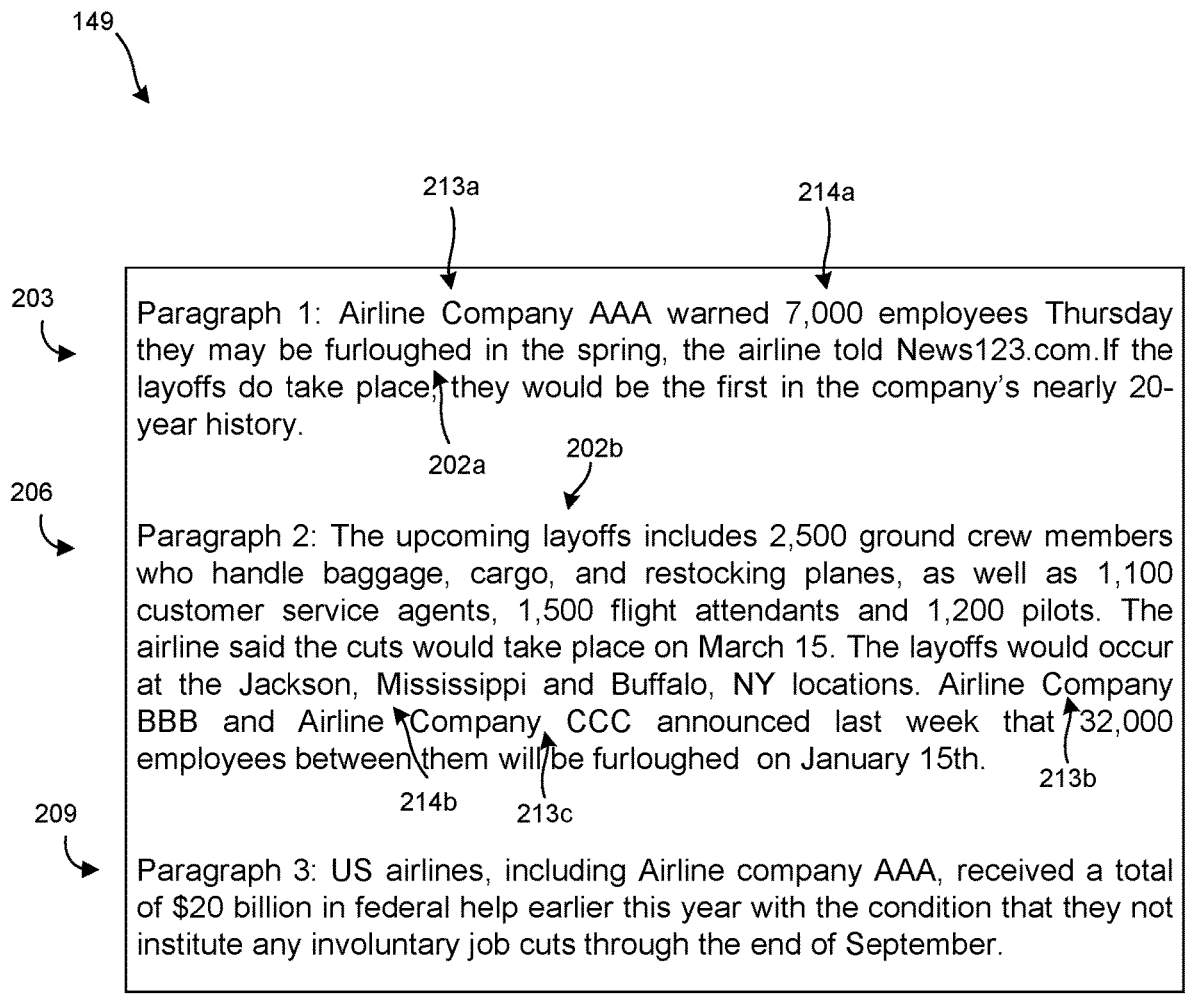
FIG. 2A is a news publication displayed by a web page according to various embodiments of the present disclosure.

Next, shown in FIG. 2A is an example of a publication web page 149 (e.g., a news article) rendered by a web site 115. The publication web page 149 can be received by the computing environment 103 (e.g., by the notification application 121 of FIG. 1) by configuring alert notifications from a search engine web site. The search engine web site can be configured to transmit content to the computing environment 103 according to user-specified criteria. In the example of FIG. 2A, an individual of a financial institution may be interested in keyword topics 135, such as layoffs or furloughs. As a result, the publication web page 149 is identified by the search engine web site because the terms "furloughed" and "layoffs" are identified at reference locations 202a and 202b in the text, among other locations in the publication web page 149.

In other examples, a news application programming interface (API) can be configured as a web scraping tool to collect new content from third party data sources 106 based on a keyword topic 135. As such, the publication web page 149 has been received by the computing environment 103 (e.g., by the notification application 121 of FIG. 1) because certain keywords in the text of the document were identified.

The text embedding service 124 (FIG. 1) can convert the text in the publication web page 149 into one or more embeddings 139. The embeddings 139 can be used by the notification application 121 to determine whether portions of the text are relevant to a specified context (e.g., a context profile 137 of FIG. 1) for the keyword topic 135. For example, the specified context may be organizations impacted by layoffs.

The embeddings 139 can include one or more numeric representations of the document. In some embodiments, each numeric representation can be represented as a multi-dimensional vector. In generating the numeric representation of the document, the text embedding service 124 can generate a numeric representation for each word, and a sentence can be represented by an aggregation of the numeric representations of its words. The text embedding service 124 can assign each paragraph a paragraph identifier.

As shown in FIG. 2A, the publication web page 149 includes first paragraph 203, second paragraph 206, and third paragraph 209. The notification application 121 can determine whether the publication web page 149 is relevant to the specified context based on the embeddings 139, and if so, which portions (e.g., paragraphs) of the text are relevant to the specified context. As will be described later, the notification application 121 can identify the first paragraph 203 and second paragraph 206 as relevant to the specified context of the keyword topic 135 of the term "layoffs" based on a comparison between the embeddings 139 of the first paragraph 203 and second paragraph 206 to a set of reference paragraphs 212 (FIG. 2B) for the keyword topic 135 of the term "layoffs."

In some embodiments, the comparison performed by the notification application 121 can include first identifying business organizations Airline Company AAA 213a, Airline Company BBB 213b, and Airline Company CCC 213c (collectively "the business organizations 213") in the first paragraph 203 and the second paragraph 206. Then, the notification application 121 can determine the specific context of these business organizations 213 in comparison to the keyword term "furloughed" at 202a and "layoffs" at 202b. For example, the notification application 121 can determine whether these business organizations 213 are a focus of the paragraphs 203, 206 or the publication web page 149.

Additionally, the comparison performed by the notification application 121 can also involve determining a magnitude of the keyword topic 135 in a particular paragraph based on identifying other context factors. For example, the notification application 121 can detect the phrase "7,000 employees" 214a and determine that it is in the same sentence as the term "furloughed" 202a. The notification application 121 can use the phrase "7,000 employees" 214a to determine a magnitude for the keyword topic 135 of "furlough."

Other context factors can be identified by the notification application 121 for the comparison analysis. For example, the notification application 121 can identify the impacted locations 214b (e.g., Jackson, Miss. and Buffalo, N.Y.) for the term "furloughed" in the text of the publication web page 149. In another example, the notification application 121 can identify a context factor related to the location of the term "furloughed" and the term "layoffs" in the first paragraph 203 and the second paragraph 206, in which these terms are located in the first sentence of these paragraphs. In some examples, the notification application 121 can identify the first paragraph 203 and the second paragraph 206 as relevant to the keyword topic 135 for further analysis, and the third paragraph 209 can be disregarded by the notification application 121. As such, the notification application 121 can filter out the third paragraph 209 when generating a subset of relevant paragraphs based on the comparison analysis.

Figure 2B:
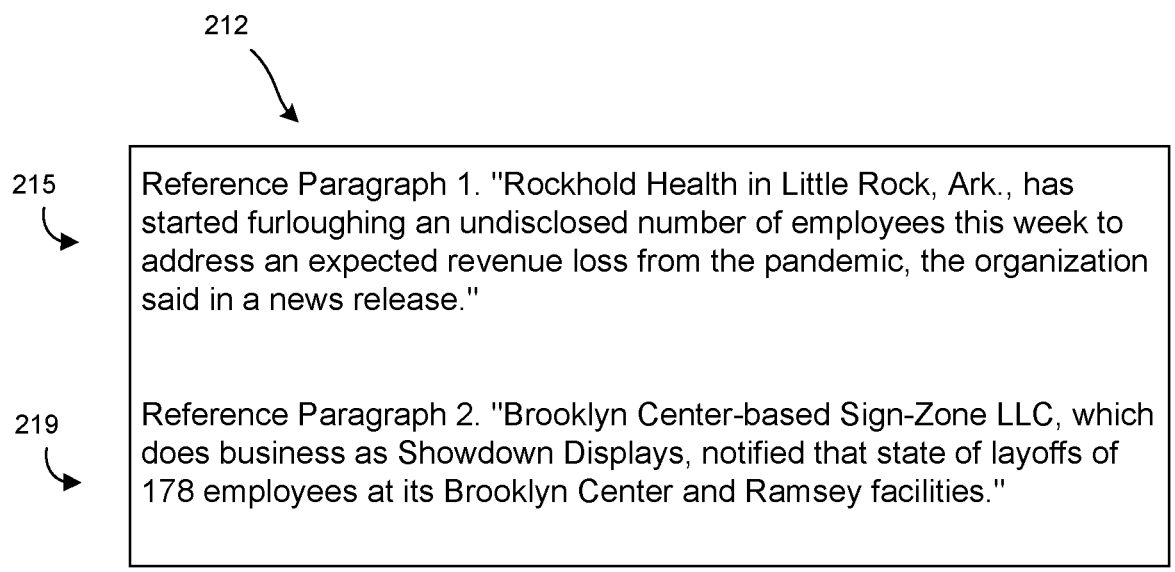
FIG. 2B is a set of reference paragraphs for a keyword topic according to various embodiments of the present disclosure.

FIG. 2B illustrates a set of reference paragraphs 212 for the keyword topic 135 of "layoff." The set of reference paragraphs 212 can be used by the notification application 121 for identifying relevant publication web pages 149 and relevant paragraphs within the relevant publication web pages 149. As shown in FIG. 2B, the set of reference paragraphs 212 include a first reference layoff paragraph 215 and a second reference layoff paragraph 219. The set of reference paragraphs 212 for a keyword topic 135 can be used by the notification application 121 to identify whether the content is relevant to the specified context (e.g., context profile 138), and if so, which portions of the content are relevant to the specified context. Accordingly, the notification application 121 can perform a comparison between the embeddings 139 (i.e., numeric representation) of the paragraphs in the publication web page 149 (FIG. 2A) and the embeddings 139 for the reference paragraphs 212 in some implementations. As such, the notification application 121 can compare one or more embeddings 139 for an individual paragraph from the publication web page 149 to one or more reference paragraphs 212 for the keyword topic 135. In the event that the comparison meets a similarity threshold (e.g., of 0.71 as measured using a cosine distance), then the notification application 121 can identify the particular paragraph as relevant to the specified context. In some embodiments, paragraphs from the publication web page 149 that do not meet the similarity threshold can be filtered out. As a result, if a particular publication web page 149 does not have any paragraphs that meet the similarity threshold, then the notification application 121 can discard the particular publication web page 149 as a whole because the particular publication web page 149 has been deemed irrelevant to the specified context of the keyword topic 135.

Additionally, the set of reference paragraphs 212 can be drafted in a manner that reflects upon the specified context (e.g., the context profile 137) for a keyword topic 135. For example, the set of reference paragraphs 212 in FIG. 2B are directed to identifying paragraphs that include organizations that are negatively impacted by the keyword topic 135 of "layoff". In this manner, the notification application 121 can operate beyond performing a sentiment analysis of the text of the content. Instead, the notification application 121 can determine a context of the keyword topic 135 used in the content. For example, the notification application 121 can determine that a news event (e.g., a layoff announcement) will have a negative impact on an organization in a publication web page 149 despite the particular language being used in the text. In some embodiments, a portion of reference paragraphs 212 can be selected for the comparison analysis based on the specified context configured for the keyword topic 135.

Further, although two reference paragraphs 212 are shown, the number of reference paragraphs 212 can vary. Additionally, different keyword topics 135 (e.g., "bankruptcy," "merger," "acquisition," "financial distress," etc.) can have different reference paragraphs 212.

Figure 3:
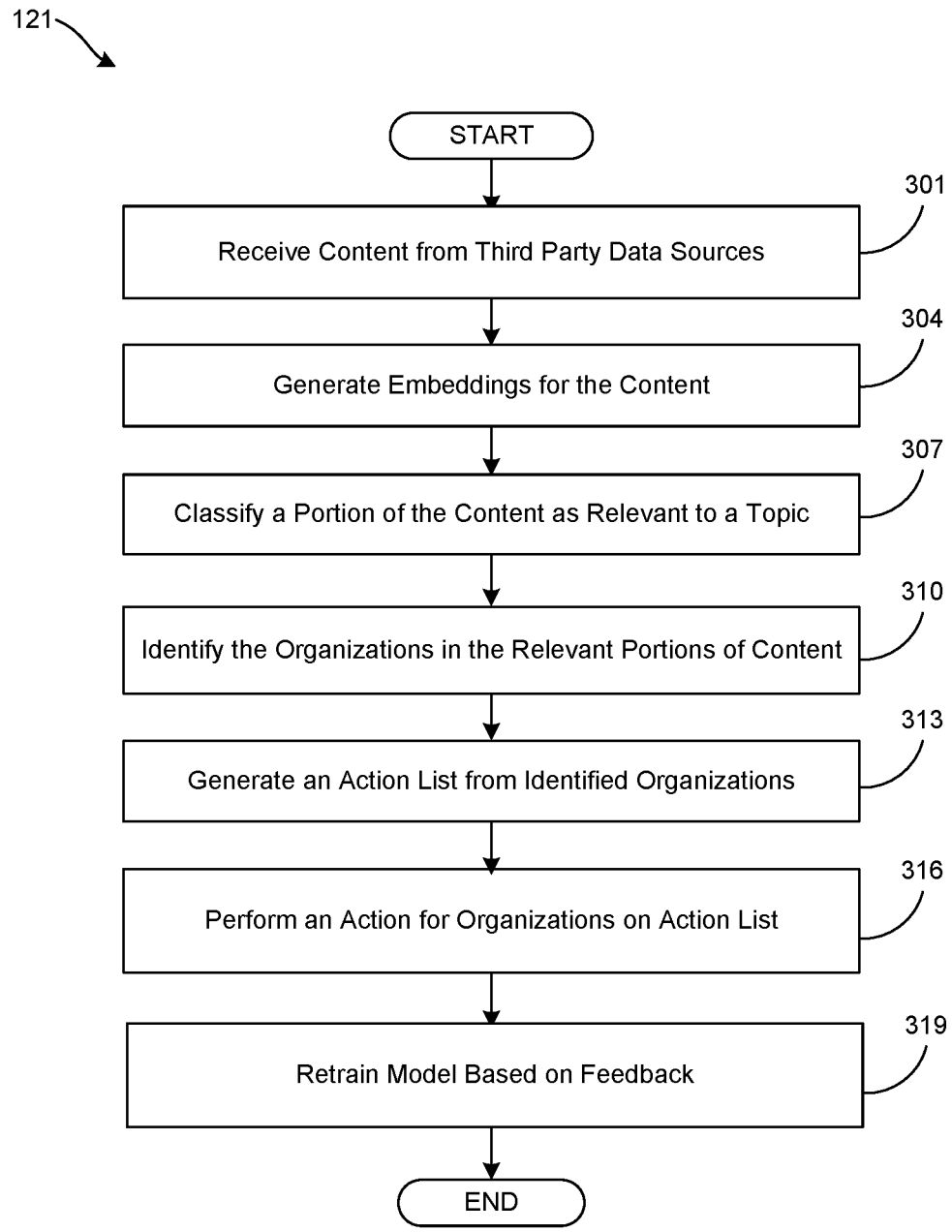
FIG. 3 is a flowchart illustrating one example of functionality implemented as portions of a notification application executed in a computing environment in the network environment of FIG. 1 according to various embodiments of the present disclosure.

Referring next to FIG. 3, shown is a flowchart that provides one example of the operation of a portion of the notification application 121. The flowchart of FIG. 3 provides merely an example of the many different types of functional arrangements that can be employed to implement the operation of the depicted portion of the notification application 121. As an alternative, the flowchart of FIG. 3 can be viewed as depicting an example of elements of a method implemented within the network environment 100. Particularly, FIG. 3 can represent one example sequence of the notification application 121 filtering content from news publication web pages and generating relevant notifications based on the filtered content.

Beginning with block 301, it is assumed a user is interested in monitoring content for a particular keyword topic 135. For example, within a financial institution, a user may be interested in keyword topics 135, such as a bankruptcy, layoffs, fraud, corruption, major health issues (e.g., pandemic diseases) for a region or a country, an oil crisis, merger and acquisitions, financial distress, and other financial related events. The notification application 121 can configure a search engine web site to transmit to the computing environment 103 publication web pages 149 associated with one or more specified keyword topics 135. For example, the notification application 121 could configure a GOOGLE® alert to provide publication web pages 149 that match one or more specified keyword topics 135. In other examples, the notification application 121 can call a content API (e.g., NewsAPI.org) to transmit to the computing environment 103 publication web pages 149 associated with one or more specified keyword topics 135. The content API searches for content on web pages that mention the keyword topics 135. As a result, the computing environment 103 can store the received publication web pages 149 in the data store 130.

In box 304, the notification application 121 can generate embeddings 139 for the publication web pages 149 using one or more machine learning techniques. The embeddings 139 can be represented as a numeric representation of the text of the publication web pages 149. For example, a text embedding service 124 (e.g., Doc2vec) can generate the embeddings 139 by generating a paragraph identifier for each paragraph (e.g., 203, 206, 209) in the publication web page 149. Then, the text embedding service 124 can generate a numeric representation or a vector for each word and/or a set of words in the paragraphs (e.g., paragraphs 203, 206, and/or 209). For example, a numeric representation can be generated to represent a word and its surrounding words. As such, each publication web page 149 can have one or more embeddings 139 representing the content in the publication web page 149 as a whole. Particularly, the embeddings 139 can include individual numeric representations for each paragraph, a sequence of words, and each word in the publication web page 149. Other machine learning techniques can be used for generating embeddings 139.

In box 307, the notification application 121 can classify a portion of multiple publication web pages 149 as relevant to the selected keyword topics 135. The classification can be based on performing a comparison between the embeddings 139 of the publication web page 149 to embeddings 139 of a set of reference paragraphs 212 for a keyword topic 135. In this example, the set of reference paragraphs 212 have been configured to identify a specified context (e.g. a context profile 137) associated with the keyword topic 135. For instance, a specified context for the keyword topic 135 of "layoffs" may include identifying organizations that are negatively impacted by layoffs. The notification application 121 can filter out publication web pages 149 that do not match or appear closely associated with the specific context of the keyword topic 135 of layoffs. For example, a news article regarding layoffs at a non-profit organization may be filtered out because it does not correspond to the specified context.

In some embodiments, the notification application 121 can input to a machine learning model 133 the embeddings 139 for the news publication web page 149 and the embeddings 139 for the set of reference paragraphs. As an output, the machine learning model 133 can provide classifications of the publication web page 149 that are relevant to the keyword topic 135 and can further identify which paragraphs or portions of the publication web page 149 are relevant to the keyword topic 135. In identifying relevant publication web pages 149, the notification application 121 can identify relevant paragraphs or portions of the publication web page 149 by comparing each paragraph of the publication web page 149 to one or more paragraphs from the set of reference paragraphs 212. If the paragraph meets a similarity threshold (e.g., a similarity threshold value of 0.71 as measured using a cosine distance), then it is considered to be relevant for the keyword topic 135 for additional processing. In some examples, the comparison is performed by measuring a cosine distance between a particular paragraph of the publication web page 149 to one or more paragraphs from the set of reference paragraphs 212. If the similarity threshold is met, then the paragraph is considered relevant to the keyword topic 135. If the paragraph fails to meet the similarity threshold, then it may be discarded. In some examples, the set of reference paragraphs 212 can be selected for comparison based on the keyword topic 135 and the context profile 137.

In box 310, the notification application 121 can identify organizations included in the relevant portions of publication web pages 149. The notification application 121 can determine which organizations are a focus of the publication web page 149. As such, the notification application 121 can determine a context in which an organization is discussed in the filtered paragraphs of the publication web page 149.

In some embodiments, the notification application 121 can apply a set of context rules 138 (e.g., heuristic rules) to determine the context of a respective entity name in the text of the publication web page 149. For example, the context may be determined based on a number of times the organization is mentioned in the relevant paragraphs, the location of the organization in the relevant paragraphs or the publication web page 149, the proximity of the organization to the keyword topic 135 in the relevant paragraphs, and other suitable context factors. For example, an organization being mentioned three times in a relevant paragraph may meet a quantity threshold (e.g., of three instances for a paragraph). As another example, an organization that is mentioned in the title or the first paragraph of the publication web or first paragraph). In another example, the organization can set a proximity threshold (e.g., of an organization instance located in the same sentence as the keyword topic 135 or located within the same paragraph as the keyword topic 135) in which the rule determines whether the organization is in the same sentence as the keyword topic 135. Other heuristic rules can vary for determining the context in which the organization is described in the publication web page 149.

In box 313, the notification application 121 can generate an action list from the identified organizations. For example, the notification application 121 can determine whether the identified organizations correspond to one or more customer entities in the customer data 134. As such, the notification application 121 can identify whether one or more of the identified organizations are a customer of an organization operating the computing environment 103.

For example, within a financial institution (e.g., a bank or a credit card company), an individual may be responsible for managing a portfolio of customers. The individual can have a user account configured to receive news alerts for the portfolio of customers. The notification application 121 can identify that one or more of the identified organizations is a customer of the financial institution and also in the customer portfolio of the individual for the financial institution. In some embodiments, the notification application 121 can use a fuzzy matching technique to identify organization name variations in the customer data 134 that are not exactly the same as an organization name in the list of identified organizations.

In some examples, the notification application 121 can combine internal customer data 134 with relevant content for a keyword topic 135. Particularly, the combination of the internal customer data 134 and a filtered publication web page 149 can be used to determine a customer action, as will be described in box 316. For example, after the list of impacted customers for an organization has been generated, the notification application 121 can retrieve customer data 134 for the list of impacted customers. For instance, the notification application 121 can retrieve account activity within a certain timeframe (e.g., within a week, a month, or a year).

The notification application 121 can retrieve account activity for one or more customers in order to determine a present circumstance of a particular customer or an industry of multiple customers. For example, the notification application 121 can retrieve account activity to determine a context of a customer account within a period of time prior to the publication of content in a publication web page 149 or a posting 153 from a social media site 118. Accordingly, the notification application 121 can determine an appropriate customer action based on context factors derived from recent account activity. These context factors can provide an indication of upcoming financial stress or stability, a potential merger or acquisition, or other characteristics.

Some notable account activity that may be detected includes a deviation from a pattern of payments, a request for change in a line of credit, a request for different payment terms, and other suitable account activity. As an example, the notification application 121 can retrieve a payment history of a customer (e.g., from the impacted customer list). The notification application 121 can determine a pattern of the customer submitting a payment for an entire amount of an account balance every thirty days over the last two years. The notification application 121 can identify a change in the pattern. For instance, the notification application 121 can detect that the last one or more submitted payments are for an amount that is less than half of the current account balance. In another instance, the notification application 121 can detect that the last one or more payments were submitted forty-five days from a notification of the customer charges. The notification application 121 can use this account activity for determining an appropriate action in box 316.

In box 316, the notification application 121 can execute an action for each organization on the action list. For example, in the previous scenario, the notification application 121 can transmit a notification for the news event to a client device 109 associated with the individual. The notification can include a customer identifier, a business organization name, a business unit, an industry, an exposure level to the publication web page 149, a uniform resource locator (URL) of the publication web page 149 that includes the news event, a publication date for the news publication web page, the retrieved internal customer data 134 (e.g., account activity data), and other suitable customer information. For instance, the notification to the client device can include a customer identifier, a URL of the publication web page 149, and account activity data (e.g., from customer data 134), such as a detection of a change in a pattern from paying off an account balance at the end of the month. In another instance, the notification can also include customer data 134 related to a request for a change in a line of credit, a request for different payment terms, and other customer requests. In other instances, the notification can also include customer data 134 related to an amount of revenue an organization has received from the customer on the action list.

In some examples, the notification can trigger the individual to review the content (e.g., the publication web page 149 and the customer data 134, such as account activity data if applicable). As a result of the content, the individual may consider adjustments to the sales and marketing activities for the identified customer. The individual may consider other actions, such as considering an adjustment to a line of credit or underwriting data for the identified organization.

In some embodiments, the notification application 121 can generate an industry notification based on one or more organizations as being impacted by a news event. For example, the notification application 121 can identify that multiple restaurant organizations have been identified in one or more news publication web pages 124 as being negatively affected by a news event. The notification application 121 can determine that a threshold number (e.g., a threshold number set to four restaurants) of restaurants have been affected for a geographical area. For instance, the industry notification can indicate that the restaurant industry in the San Francisco Bay area is negatively affected from a state-mandated restriction against indoor dining. The industry notification can be generated because of multiple publication web pages 149 reporting several restaurants in the San Francisco Bay area are under financial distress because of the state-mandated restriction.

In some examples, the notification application 121 can invoke the automated servicing application 127 for performing a customer action. For example, within a financial institution, the automated servicing application 127 can cause for the automated adjustment of a line of credit, sales and marketing offers, and underwriting data for the identified organization. In some cases, the automated servicing application 127 can factor in customer data 134 (e.g., account activity data) in order to determine a customer action. For instance, the automated servicing application 127 can identify that a particular customer on the action list has deviated from a pattern of paying off an account balance at the end of the month. The automated servicing application 127 can consider this recent account activity data with the cited publication web page 149 (e.g., layoff announcement), which is determined to likely have a negative impact on the particular customer. Accordingly, the automated servicing application 127 can select in an automated manner to lower a line of credit, refrain from transmitting marketing materials, adjust terms or conditions, and other suitable actions as appropriate.

In box 319, the notification application 121 can retrain or adjust the machine learning model 133 based on feedback for the executed action (e.g., a notification sent to the client device 109). In some cases, the notification application 121 can receive the feedback from one or more client devices 109. By providing the feedback to the machine learning model 133, the notification application 121 can use the machine learning model 133 to provide actions (e.g., notifications) that are tailored to the interests of the user of the client device 109. The machine learning models 133 can use the feedback to adjust the filtering of content for one or more keyword topics 135 and a specific context (e.g. context profile 137), as described for box 307. Additionally, the machine learning model 133 can use the feedback to adjust the identification of organizations, as described for box 310.

As an example, the notification application 121 can transmit a notification of the publication web page 149 to the client device 109 as an action, as previously discussed for box 316. The user of the client device 109 can review the notification and/or the content of the publication web page 149. The user can manipulate a user interface displayed on the client device 109 to indicate whether the publication web page 149 should be labeled or classified as relevant to the keyword topic 135 and/or the customer (e.g., the customer identifier associated with the notification). In a first instance, the client device 109 can transmit to the notification application 121 an indication that a first notification of a first publication web page 149 is not relevant to the keyword topic 135 and/or the customer. Subsequently, in a second instance, the client device 109 can transmit an indication that a second notification of a second publication web page 149 is relevant to the keyword topic 135 and/or the customer.

In some cases, the notification application 121 can store the user feedback in the data store 130 as customer data 134. As such, the notification application 121 can store a log of user feedback from various actions (e.g., notifications) over a period of time (e.g., over a twenty-four hour time period, a week, a month, a year or multiple years). The notification application 121 can adjust the machine learning model 133 periodically, automatically upon receiving feedback from the client device 109, and at other appropriate times. In some embodiments, the user feedback can be used by the notification application 121 to adjust the machine learning models 133 in order to provide actions (e.g., notifications of content) of interest to a particular user of the client device 109 (e.g., a user account logged into the client device 109). The notification application 121 can then proceed to the end.

Figure 4:
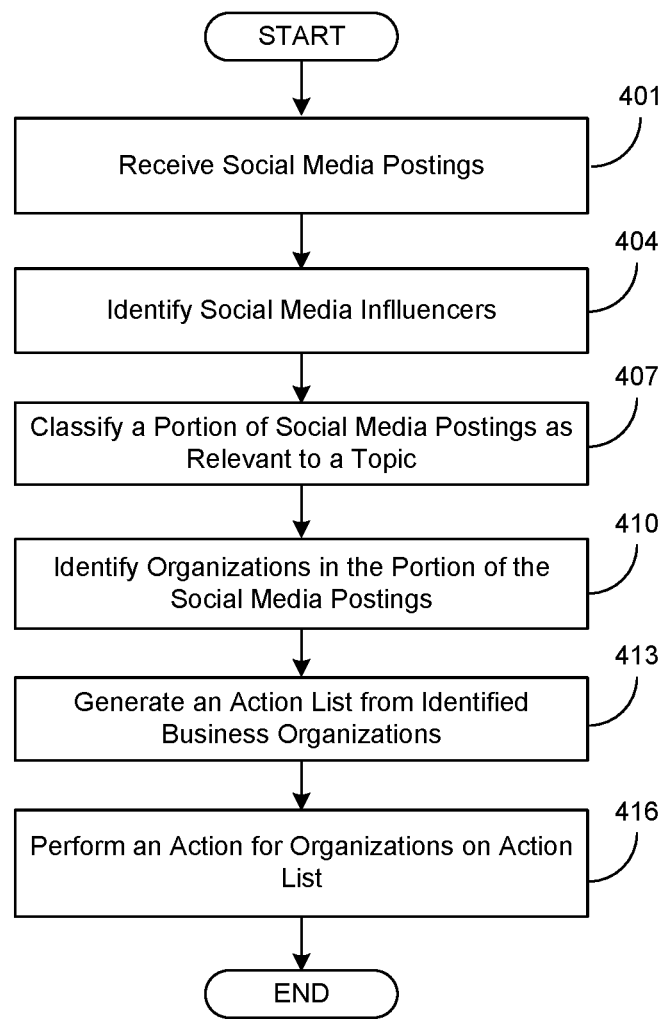
FIG. 4 is a flowchart illustrating one example of functionality implemented as portions of a notification application executed in a computing environment in the network environment of FIG. 1 according to various embodiments of the present disclosure.

Referring next to FIG. 4, shown is a flowchart that provides one example of the operation of a portion of the notification application 121. The flowchart of FIG. 4 provides merely an example of the many different types of functional arrangements that can be employed to implement the operation of the depicted portion of the notification application 121. As an alternative, the flowchart of FIG. 4 can be viewed as depicting an example of elements of a method implemented within the network environment 100. Particularly, FIG. 4 can represent one example sequence of the notification application 121 filtering content from posts 153 on social media sites 118 and generating relevant notifications based on the filtered content. Particularly, FIG. 4 can represent one example sequence of the notification application 121 filtering content from postings 153 from social media sites 118.

Beginning with block 401, it is assumed a user is interested in the notification application 121 monitoring content for a particular keyword topic 135. The notification application 121 can configure the social media sites 118 or a social media aggregator to transmit to the computing environment 103 postings 153 associated with one or more specified keyword topics 135. As a result, the computing environment 103 can store the received postings 153 in the data store 130.

In box 404, the notification application 121 can identify social media accounts of social media influencers for a particular keyword topic 135. For example, the notification application 121 can identify social media accounts that are influential in the keyword topic 135 of "bankruptcy." The notification application 121 can consider various factors for identifying influential social media accounts, such as a number of postings 153 on a keyword topic 135, a number of social media followers, a number of user views for a posting 153, occupation or job title, employer or organizations associations with social media account, and other suitable traits for determining a user's authority for the keyword topic 135. These factors can be considered with respect to one or more social media thresholds (e.g., a threshold number of social media followers, a threshold number of social media posts for a keyword topic 135, a particular job occupation included in the user social media profile). In some embodiments, the posting 153 from the identified social media influencers can be given greater weight in a classification of a postings 153 as credible or relevant to a keyword topic 135.

In box 407, the notification application 121 can classify a portion of the postings 153 as relevant to a keyword topic 135. The notification application 121 can classify a portion of text from several messages in a forum on a social media site 118. In other embodiments, the notification application 121 can classify a portion of text from a social media feed.

Additionally, the classification of text from the postings 153 can involve several different approaches based on determining whether a threshold (e.g., a threshold quantity of eight postings) of social media accounts have published similar statements. For example, a social media account of a newspaper organization may publish a posting 153 that states that Hospital Organization AAA will be starting a bankruptcy proceeding this week. In this example, the notification application 121 identifies ten additional postings 153 from multiple social media accounts. The ten additional postings 153 can meet the threshold for validating the initial posting 153 by the social media account of the newspaper organization based on the ten postings being published within a predefined time period (e.g., within 24 hours). As a result, the initial positing 153 can be classified as a relevant posting 153 for the keyword topic 135 of "bankruptcy." Alternatively, in some examples, the notification application 121 can classify the initial posting 153 as relevant based on the posting 153 being from the newspaper organization, which may have been determined to be a social media influencer as described in box 404.

In some embodiments, the notification application 121 can covert text from the postings 153 to one or more embeddings 139 or a numeric representation. The embeddings 139 can be compared to one or more embeddings of a reference for the keyword topic 135, as described in FIG. 3. In other embodiments, the generation of one or more embeddings 139 for the postings 153 can be omitted.

In box 410, the notification application 121 can identify one or more organizations included in relevant portions of the postings 153 based on the context of the organizations described in the postings 153. In some examples, the notification application 121 can determine which organizations are the focus of the posting 153. As such, the notification application 121 can determine a context in which an organization is discussed in the postings 153. In some embodiments, the context can be determined based on a context profile 137 associated with the keyword topic 135. Additionally, the context can also be determined by a comparison between one or more embeddings 139 of the text for the postings 153 to a reference embedding for a keyword topic 135. In some embodiments, the generation of one or more embeddings 139 for the postings 153 can be omitted.

In box 413, the notification application 121 can generate an action list from the identified organizations. The notification application 121 can determine whether the identified organizations correspond to one or more customer entities in the customer data 134. As such, the notification application 121 can identify whether one or more of the identified organizations are a customer of an organization operating the computing environment 103. In some embodiments, the notification application 121 can perform similar process as described in box 313 of FIG. 3.

In box 416, the notification application 121 can execute an action for each customer on the action list. The notification application 121 can perform similar functionality as described in box 316 of FIG. 3. For example, in some embodiments, the notification application 121 transmits a notification to a client device 109. The notification can include a customer identifier, a business organization name, a business unit, an industry, an exposure level to the content described in the postings 153, a uniform resource locator (URL) of the postings 153, a publication date for the postings 153, and other suitable data related to the postings 153. In some embodiments, the notification application 121 can generate an industry notification based on one or more organizations as being impacted by an event in the text of the postings 153.

In some examples, the notification application 121 can invoke the automated servicing application 127 for performing a customer action. For example, within a financial institution, the automated servicing application 127 can cause for the automated adjustment of a line of credit, sales and marketing offers, and underwriting data for the identified organization. Then, the notification application 121 can proceed to the end of the depicted process.

A number of software components previously discussed are stored in the memory of the respective computing devices and are executable by the processor of the respective computing devices. In this respect, the term "executable"

means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 3 and FIG. 4 represent the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIG. 3 and FIG. 4 follow a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts of FIG. 3 and FIG. 4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, and/or Z, or any combination thereof (e.g., X; Y; Z; X and/or Y; X and/or Z; Y and/or Z; X, Y, and/or Z, etc.). Thus, such disjunctive language is not generally intended to, and should not, imply that certain embodiments require at least one of X, at least one of Y, and/or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
      receive a plurality of publications from a third party data source based at least in part on a keyword topic, wherein the plurality of publications are individually displayed on a respective web page and include an event associated with the keyword topic;
      generate an embedding for at least one of the plurality of publications based at least in part on executing a text embedding service, wherein the embedding comprises a plurality of numeric representations that individually correspond to a unique word;
      determine a reference embedding associated with the keyword topic based at least in part on a context profile that provides a particular context of use for the keyword topic, the context profile including a criteria for filtering the plurality of publications related to a context of use for the keyword topic;
      classify a subset of the plurality of publications as associated with the keyword topic by generating a similarity score from the embedding of the plurality of publications and the reference embedding associated with the keyword topic;
      identify a plurality of organizations included in the subset of the plurality of publications based at least in part on a context of a respective organization included in the subset of the plurality of publications;
      generate a list based at least in part on identifying a portion of the plurality of organizations corresponding to an entity name in a database; and
      transmit a notification to a client device, wherein the notification includes the entity name from the list and a uniform resource locator for the respective web page associated with the event.

2. The system of claim 1, wherein generating the embedding for the at least one of the plurality of publications further comprises generating a paragraph embedding for each of a plurality of paragraphs of the plurality of publications.

3. The system of claim 2, wherein classifying the subset of the plurality of publications further comprises identifying a respective paragraph of a respective publication that meets a similarity threshold associated with the keyword topic based at least in part on a comparison between the paragraph embedding to the reference embedding associated with the keyword topic.

4. The system of claim 3, wherein the plurality of organizations are identified in the respective paragraph that meets the similarity threshold.

5. The system of claim 1, wherein the context of the respective organization in the subset of the plurality of publications is determined based at least in part on a plurality of context rules.

6. The system of claim 5, wherein the plurality of context rules comprises at least one of a number of instances of the respective organization occurring in a respective publication or a number of instances of the respective organization occurring in a paragraph.

7. The system of claim 6, wherein the plurality of context rules comprises at least one of a location of the respective organization occurring in the respective publication, or a distance between an instance of the respective organization and an instance of the event in the respective publication.

8. A computer-implemented method, comprising:
   receiving, by a computing device, a plurality of publications from a third party data source based at least in part on a keyword topic, wherein the plurality of publications are individually displayed on a respective web page and include an event associated with the keyword topic;
   generating, by the computing device, an embedding for at least one of the plurality of publications based at least in part on a text embedding application, wherein the embedding comprises a plurality of numeric representations that individually correspond to a unique word;
   determining, by the computing device, a reference embedding associated with the keyword topic based at least in part on a context profile that provides a particular context of use for the keyword topic, the context profile including a criteria for filtering the plurality of publications related to a context of use for the keyword topic;
   classifying, by the computing device, a subset of the plurality of publications as associated with the keyword topic by generating a similarity score from the embedding of the plurality of publications and the reference embedding associated with the keyword topic;
   identifying, by the computing device, a plurality of organizations included in the subset of the plurality of publications based at least in part on a context of a respective organization in the subset of the plurality of publications;
   generating, by the computing device, a list based at least in part on identifying a respective subset of the plurality of organizations corresponding to an entity name in a database; and
   transmitting, by the computing device, a notification to a client device, wherein the notification includes the entity name from the list and a uniform resource locator for the respective web page associated with the event.

9. The method of claim 8, wherein generating the embedding for the at least one of the plurality of publications further comprises generating a paragraph embedding for each of a plurality of paragraphs of the plurality of publications.

10. The method of claim 9, wherein classifying the subset of the plurality of publications further comprises identifying, by the computing device, a respective paragraph of a respective publication that meets a similarity threshold associated with the keyword topic based at least in part on a comparison between the paragraph embedding to the reference embedding associated with the keyword topic.

11. The method of claim 10, wherein the plurality of organizations is identified in the respective paragraph that meets the similarity threshold.

12. The method of claim 8, further comprising:
receiving, by the computing device, feedback from the client device, wherein the feedback is associated with the notification; and
adjusting, by the computing device, a machine learning model based at least in part on the feedback, wherein the machine learning model classified the subset of the plurality of publications as being associated with the keyword topic.

13. The method of claim 8, wherein the context of the respective organization in the subset of the plurality of publications is determined based at least in part on a plurality of context rules.

14. The method of claim 13, wherein the plurality of context rules comprises at least one of a location of the respective organization occurring in a respective publication, or a distance between an instance of the respective organization and an instance of the event in the respective publication.

15. A non-transitory, computer-readable medium, comprising machine-readable instructions that, when executed by a processor of a computing device, cause the computing device to at least:
receive a plurality of social media postings from a third party data source based at least in part on a keyword topic, wherein the plurality of social media postings include an event associated with the keyword topic;
identify a social media user account that meets a social media threshold associated with the keyword topic, wherein the social media user account generated a respective posting among the plurality of social media postings;
classify the respective posting as associated with the keyword topic based at least in part on a similarity score from a respective embedding for the respective posting and a reference embedding, the reference embedding being associated with a context profile that provides a particular context of use for the keyword topic, the context profile including a criteria for filtering the plurality of social media postings related to a context of use for the keyword topic;
identify an organization included in the respective posting;
determine that the organization corresponds to an entity name in a database; and
transmit a notification to a client device, wherein the notification includes the entity name and a uniform resource locator for the respective posting associated with the event.

16. The non-transitory, computer-readable medium of claim 15, wherein the identification of the organization further comprises generating an embedding of the respective posting.

17. The non-transitory, computer-readable medium of claim 16, wherein the identification of the organization further comprises comparing the embedding to the reference embedding associated with the keyword topic.

18. The non-transitory, computer-readable medium of claim 17, wherein the organization is identified based at least in part on a threshold number of the plurality of social media postings that include the event, and the threshold number of the plurality of social media postings published within a time period.

19. The non-transitory, computer-readable medium of claim 15, wherein the social media threshold associated with the keyword topic comprises at least one of a number of social media followers for the social media user account or a number of postings that include the keyword topic.

20. The method of claim 8, wherein the reference embedding is generated based at least in part on a reference text paragraph that includes a particular keyword topic, the reference text paragraph including the particular keyword topic in the particular context of use.

* * * * *